United States Patent [19]
Hale

[11] Patent Number: 6,021,823
[45] Date of Patent: Feb. 8, 2000

[54] METHOD AND APPARATUS FOR PULL AWAY PREVENTION

[76] Inventor: David L. Hale, Gilmore & Crawford, Glenwood, Ark. 71943

[21] Appl. No.: 08/914,852

[22] Filed: Aug. 18, 1997

[51] Int. Cl.[7] ........................................ B65B 1/04
[52] U.S. Cl. .................. 141/231; 141/192; 123/198 DC; 180/286
[58] Field of Search .................................. 141/231, 192; 123/198 DC; 180/286

[56] References Cited

U.S. PATENT DOCUMENTS

| 5,329,164 | 7/1994 | Saito | 307/10.1 |
| 5,720,327 | 2/1998 | Foster, Jr. | 141/207 |

*Primary Examiner*—Henry J. Recla
*Assistant Examiner*—Peter deVore
*Attorney, Agent, or Firm*—Stephen D. Carver

[57] ABSTRACT

Devices and methods for preventing pull away or drive away incidents. The preferred devices can be retrofitted to critical gas pipes on fuel trucks or gas tanker trucks. A version of my device can be readily employed with conventional automobiles. Through my system a vehicle engine cannot start or continue to ram until a proper disconnection is made from a fueling or refueling source. The preferred protection device comprises a rigid, frame having a base portion connected to a gas pipe with spaced apart clamps. An elongated arm pivotally extending from the frame terminates in a blocking plate. The blocking plate can be user-deflected to either block access to the gas connection, or to expose it. When disposed in the blocking position, the arm activates a spark-proof ignition switch, which enables the ignition circuit in the vehicle being fueled or loaded. When the blocking plate is deflected away to expose the gas connection, ignition is interrupted or prevented by the switch and the vehicle's engine cannot start or continue to run. After disconnecting the hose properly, the ignition circuit is reestablished by the switch concurrently with the return of the blocking plate. I have adapted the concepts of my device for ordinary automobiles to prevent pull away incidents at gasoline stations.

12 Claims, 9 Drawing Sheets

METHOD AND APPARATUS FOR PULL AWAY PREVENTION

BACKGROUND OF THE INVENTION

I. Field of the Invention

This invention relates generally to fueling valves and couplings used in the dispensing or loading of gasoline, butane, propane, other fuels, hazardous materials, or the like. More particularly, the present invention relates to a method and devices for preventing dangerous "pull aways" that can occur when drivers refuel or reload tanks of fuel.

II. Description of the Prior Art

Propane gas is dispensed from large facilities through special valves which must be releasably coupled to delivery trucks by operators. A variety of hardware items are known in the art for coupling the fuel pipes and systems together. One persistent and dangerous problem relates to "pull aways" or "drive aways."

Propane delivery trucks are routinely refilled at a central facility. Fuel receptive fittings are mated to appropriate dispensing hoses, and when the truck is filled, safety valves are closed and the apparatus should be disconnected. Even experienced drivers may forget to disconnect the fueling valves and hoses before driving away. If the high pressure gas transfer hoses are still connected, a disaster can result. When the truck driver forgets to disconnect the fueling connection before attempting to drive away, the connection will be violently broken. Even though certain "break away" safety valves are normally employed in anticipation of the drive away problem, the hose and/or metal parts may violently snap backwards. When the broken hose forcibly slams into concrete or metallic surroundings, sparks can result. Leaking gases may easily be ignited with potentially life-threatening consequences. In the past, lives have been lost to fires and explosions proximately caused by such drive aways.

A similar problem also afflicts self service gasoline stations. When an ordinary motorist forgets to disconnect the gas pump after refueling, the hose will be broken when he drives off. When the "pull away" occurs, the hose or dispenser may snap back and injure a bystander. Worse yet, spilled gasoline may possibly ignite. At the very least the gasoline pump will be damaged, and the station owner will be subject to down time, lost revenue, and expensive repairs.

It is well known in the propane dispensing art that "pull aways" initiate accidents. Remedial actions have been proposed. At this time it is conventionally recommended that drivers remove their ignition keys and hang them on a peg board as a reminder to disconnect before driving away. Obviously this procedure is inadequate. It is often forgotten or ignored. As a result, several hundred pull-away incidents occur each year.

Finally, "pull aways" are not limited to fueling or refueling situations. They have occurred in the past in conjunction with the loading of hazardous waste trucks. Hence my inventions also have relevance in the field of hazardous waste management.

SUMMARY OF THE INVENTION

I have designed a retrofittable, pull away prevention system that can be retrofitted to fuel trucks, gas tanker trucks, hazardous waste tankers, and other vehicles. It can be readily employed at gasoline, butane and propane dispensing stations to prevent "pull away" disasters. In one embodiment a modification to automobiles is proposed. Simply stated, when my method or devices are employed properly, a vehicle engine cannot start or run until a proper disconnection is made from the fueling source (i.e., the gas or liquid transfer connection).

Preferably, my fuel truck protection device comprises a rigid, preferably metallic frame. A frame base portion is connected through a pair of spaced apart clamps to a shaft portion on a receptive hose connection. It may be coupled either to the truck or to the service output valve depending upon requirements. An elongated arm extending from the frame controls an ignition switch. The arm terminates in a blocking plate that can interfere with the fueling connection. The arm is pivotally hinged to the frame so that it may move into a position that physically blocks the hose connection output valve. When the blocking plate is so disposed, the vehicle's engine can start or run, as its ignition circuit is reestablished or enabled. Before fueling or tank loading can occur, the blocking plate must be user-deflected to an out-of-the way position. When disposed in this moved position, the arm releases the spark-proof ignition switch that interrupts the ignition circuit in the vehicle being fueled or loaded to make sure the vehicle engine stops running.

Therefore, a vehicle that is being fueled cannot start and then leave after refueling or loading without disconnecting the appropriate hoses and connections. At the same time, the vehicle cannot be left idling while refueling because it cannot open the hose connection, according to the teachings of the invention, without first interrupting its ignition circuit. Variations in the basic concept are proposed for angled fuel connections. Further, I have adapted the concepts of my invention for ordinary automobiles.

Therefore, an object of my invention is to prevent "drive aways" or "pull aways."

A related object of my invention is to reduce the carnage that otherwise occurs from "drive aways" or "pull aways."

Another important object of my invention is to prevent fires, explosions and the like from occurring at fuel dispensing or hazardous waste stations.

A further object of my invention is to prevent the inadvertent destruction of hose fittings and fueling couplings at gasoline, butane and propane service stations and the like.

Another object of my invention is to increase operator and driver safety.

A related object is to provide a safe working environment for fuel delivery personnel who operate the trucks or the dispensing hardware.

A very important object of my invention is to prevent explosions and dangerous fires at fueling stations.

Another object of my invention is to provide a system of the character described above, but relating to automobiles. Stated another way, it is an important object of this invention to provide a system for automobiles that prevents "pull away" disasters at refueling stations.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
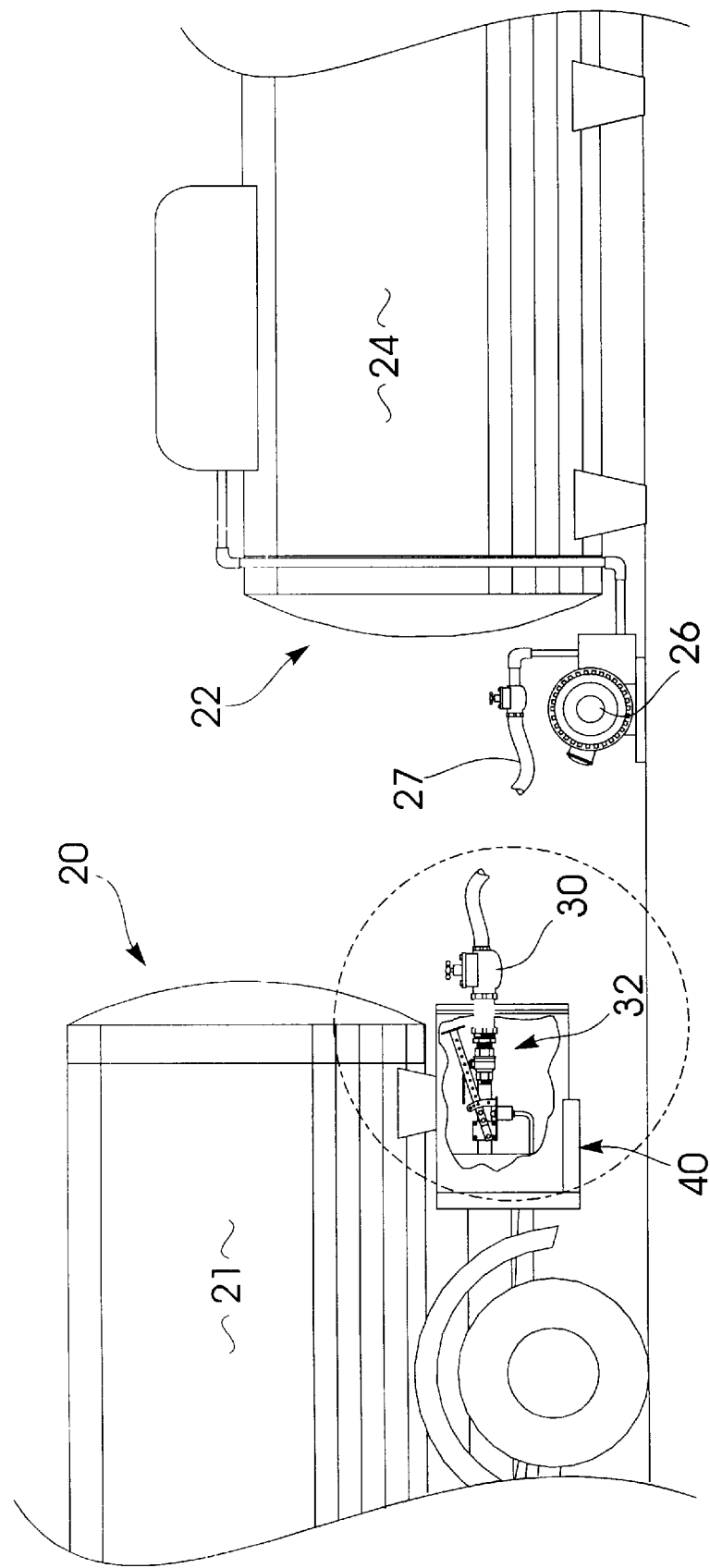
FIG. 1 is a partially fragmentary pictorial view showing my invention in use in conjunction with a typical propane delivery vehicle being refueled.
Figure 2:
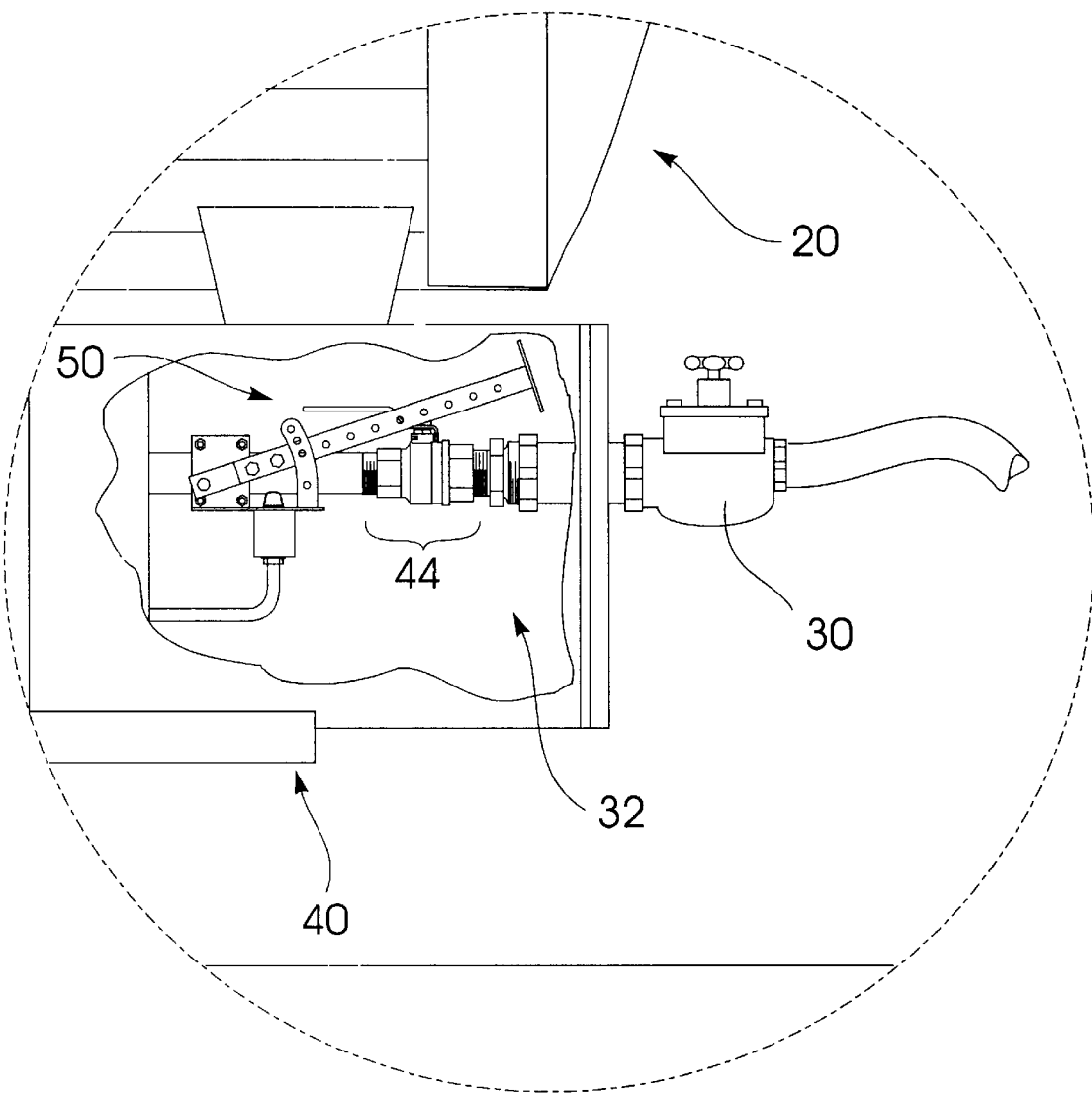
FIG. 2 is an enlarged, partially fragmentary isometric view of the circled portion of FIG. 1, showing a first embodiment of my device associated with typical delivery truck fuel loading hardware.

With initial reference directed to FIGS. 1 and 2 of the appended drawings, tanker trucks such as propane truck 20 (FIG. 1) may be loaded with gas at a conventional gas refueling station 22. For example, propane gas stored in a tank 24 is outputted during truck refueling through a pump 26 via a hose 27. The fueling hose 27 leads to a regulator valve 30 in turn coupled to a quick connect apparatus 32. The driver of truck 20 will typically attach the apparatus within the protected compartment 40 at the rear of the truck 20. Truck equipment will include a typical LP gas shut-off valve 44, (FIG. 2), to which the fueling station connection 32 is made. If after loading tank 21 on truck 20 the driver forgets to disconnect the hose 27, the hose and connection will break and snap back. A quantity of gas will be wasted and sprayed about the facility, and if ignition occurs a disaster may result.

Such "pull aways" are not uncommon in the gas refueling industry. As explained hereinafter, there are certain quick connect break-away adapters that minimize the damage, but nevertheless safety is impaired when this occurs. Through the system to be described, the motor powering truck 20 is rendered incapable of operating during loading. The ignition is disabled during refueling, and the truck cannot be moved or driven away, and the "pull away" or "drive away" problem is avoided. The driver must disconnect the hose apparatus from within compartment 40 and remove it according to normal safety operations before motor ignition will be possible.

Referring jointly now to FIGS. 1 through 6, the best mode of my invention has been generally designated by the reference numeral 50. The device 50 is adapted to be installed within refueling compartment 40, generally at the rear of typical propane truck 20. It will be appreciated by those skilled in the art that the hardware may be located elsewhere to accommodate different situations. Compartment 40 may take on a variety of configurations. My safety apparatus can be externally installed as later described.

Figure 4:
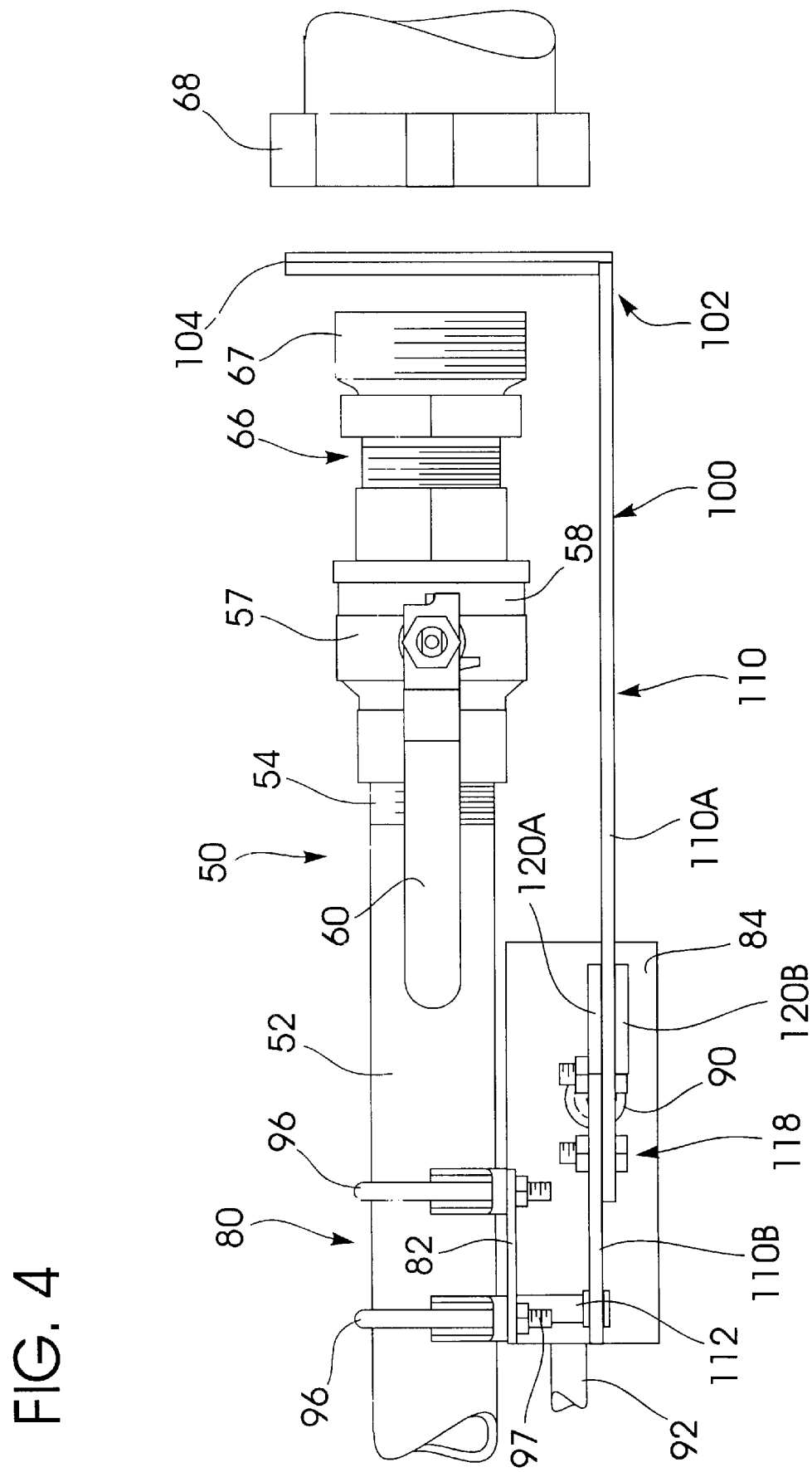
FIG. 4 is a fragmentary top plan view of the invention of FIG. 3.
Figure 5:
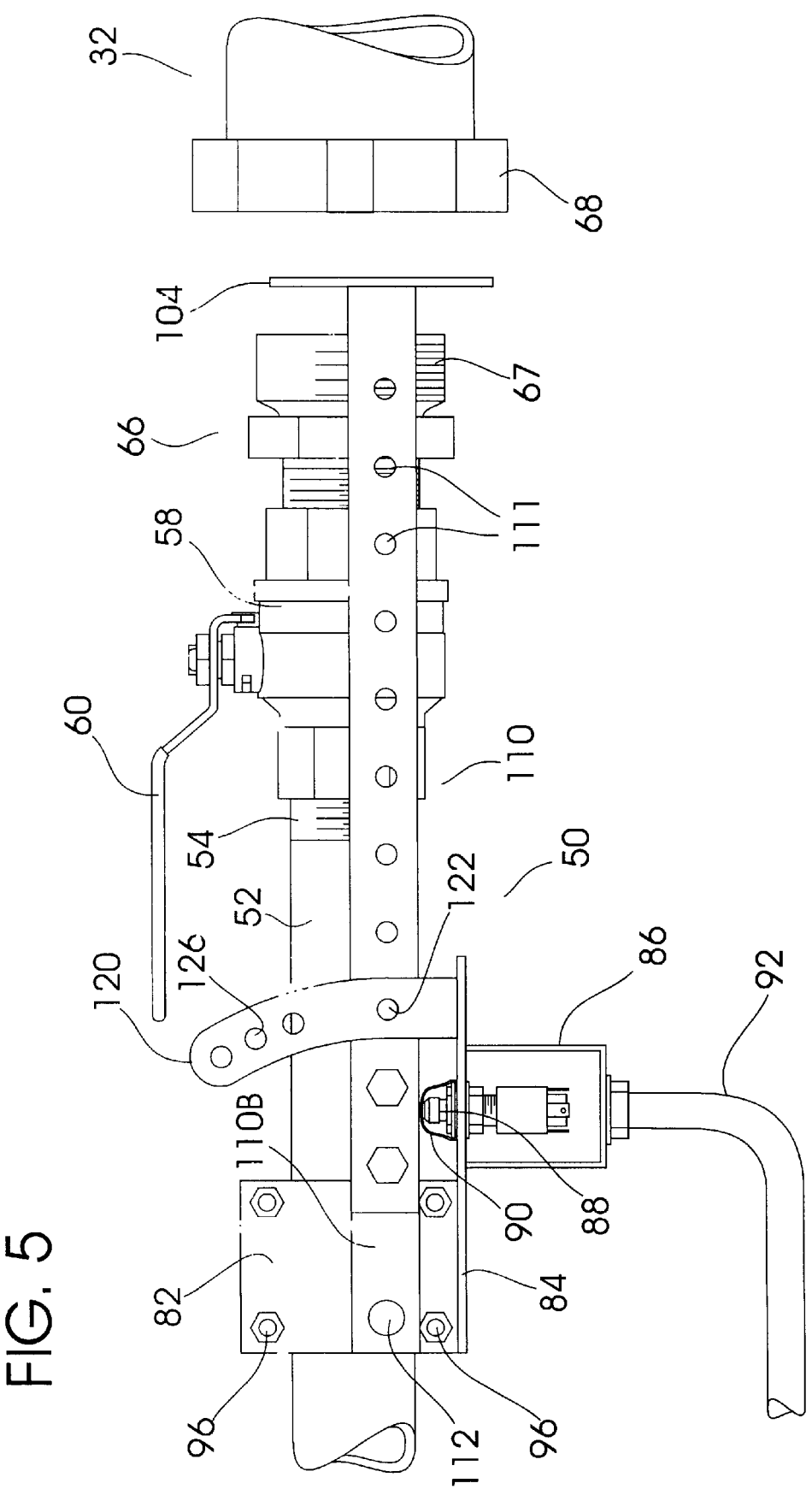
FIG. 5 is a fragmentary side elevational view of the invention of FIGS. 1–4, with the lever arm disposed in a blocking position.
Figure 6:
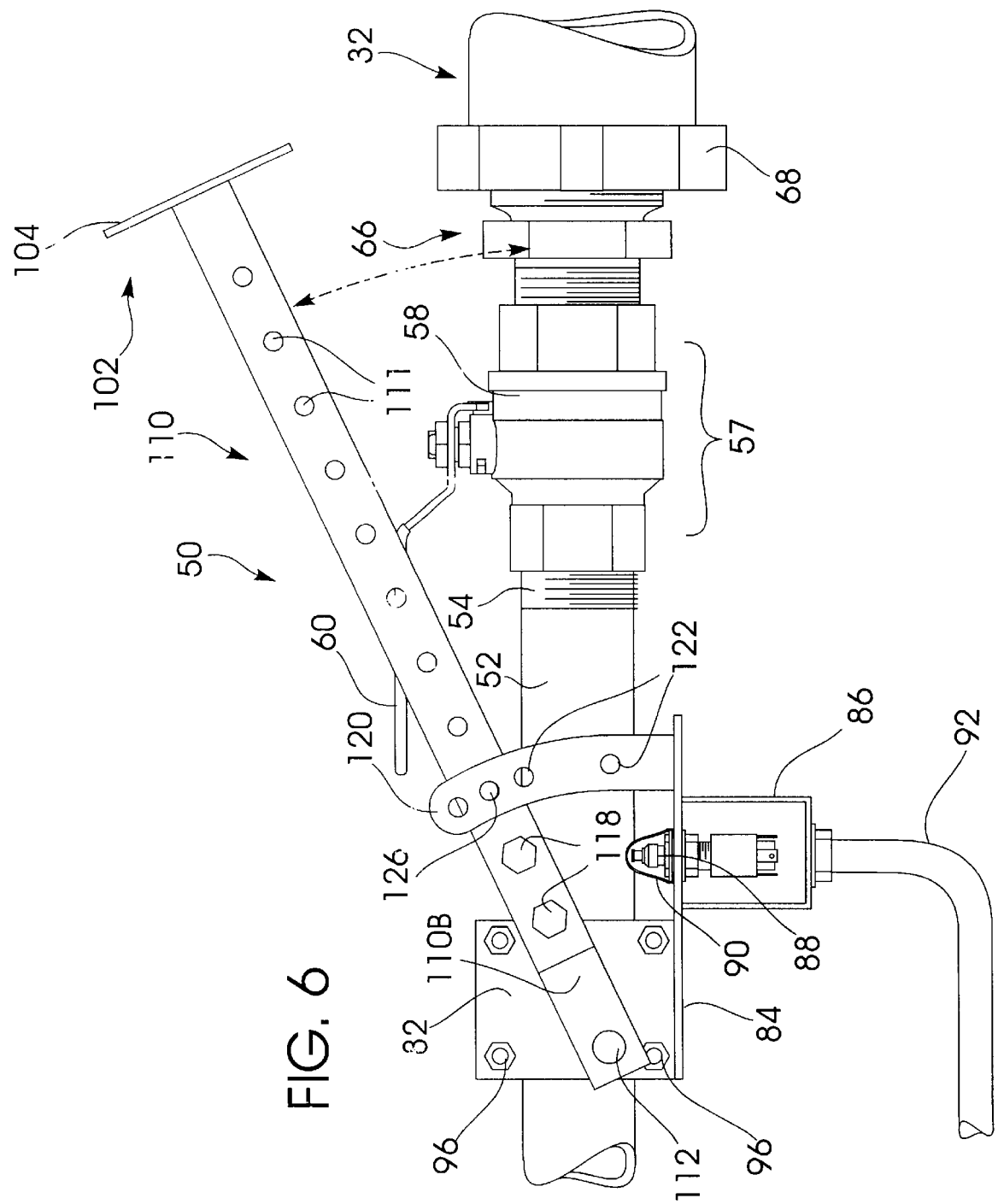
FIG. 6 is a view similar to FIG. 5, but showing the lever arm displaced to expose the gas connection.

As best seen in FIGS. 4–6, the outlet pipe that is conventionally associated with truck 20 within compartment 40 has been generally designated by the reference numeral 52. Unit 50 is attached to pipe 52 to selectively block or unlock the gas connection. Conventional pipe 52 ends in threaded end 54 that mates with an LP gas shut-off valve 57. A typical LP shut-off valve encountered in the field is a Jomar-brand 02-G-GA. It has a main body portion 58 containing a suitable shut-off valve operated by handle 60. Once the apparatus is connected, as will be recognized by those skilled in the art, handle 60 is deflected to transfer gas. In most installations a break-way adapter 66 is threadably mated to the shut-off valve 58. The coupling end of hose 27 (FIG. 1) comprises a suitable fitting 32 (FIGS. 5, 6) including an appropriate nipple connection and a manually adjustable, threaded coupling 68 that threadably mates to the threaded end 67 (FIGS. 4, 5) of adapter 66.

In FIG. 5, the fuel loading hose connection is prevented. It is apparent that my fuel pull-away preventer 50 obstructs attachment of coupling 68. Truck ignition, however, is not blocked at this point. On the other hand, with the arm of the preventer displaced away (FIG. 6), the connection may be established for subsequent gas transfer since the pipe fitting elements are exposed. At the latter time, however, truck ignition is disabled as described hereinafter.

Prevention device 50 comprises a rigid frame 80 preferably having a mounting plate 82 and a perpendicular base plate 84. Preferably preventer 50 is secured to pipe 52 by a pair of muffler clamps 96 that penetrate frame plate 82. The threaded ends 97 of the clamps (FIG. 4) are bolted to the frame plate 82. Clamps 96 are tightened after appropriately spacing the device so that lever arm 100 is properly positioned to block the gas connection, as illustrated in FIG. 4.

Base plate 84 secures a suitable switch housing 86 that mounts a spark-proof electrical switch 88. Switch 88 is covered and isolated with a rubber seal 90. Conduit 92 runs to the vehicle ignition system so that switch 88 makes or breaks the ignition circuit to either establish or deny ignition. In some cases the switch may be wired directly to the ignition circuit. Alternatively, it may be coupled to suitable relays to control the vehicle ignition and the vehicle starter through conventional wiring. With diesel engines the switch will be interconnected with the vehicle fuel control "ignition" circuitry normally associated with the high pressure fuel injection pump.

Lever arm 100 controls switch 88, and it terminates in a remote end 102 coupled to a transversely mounted blocking plate 104. Blocking plate 104 either prevents or allows connection of the gas couplings. With lever arm 110 and plate 104 disposed as in FIG. 4, the lever arm 110 contacts switch 88 previously described to establish or maintain ignition so that a vehicle may be started or it may continue to run; however at this time a fueling connection is prevented. When the arm 110 moves to the position seen in FIGS. 3 or 6, vehicle ignition is prevented, but gas fueling or fuel transfer is allowed as the connections are exposed.

Figure 3:
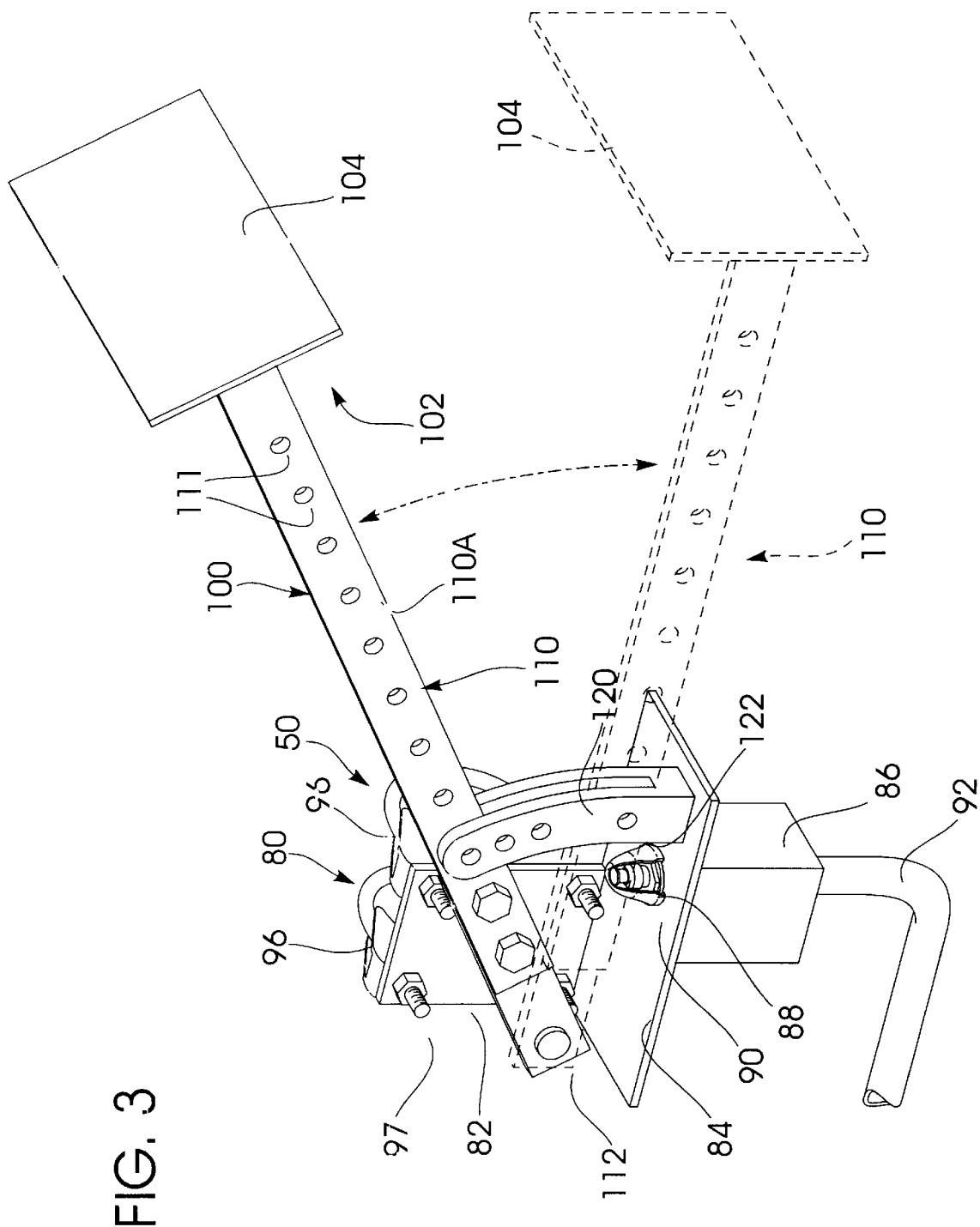
FIG. 3 is an enlarged, fragmentary isometric view of a first embodiment of my invention, with a moved position of the blocking plate and arm shown in dashed lines.

Arm 110 preferably comprises an elongated, major portion 110A that is fastened to a pivoted portion 110B journalled to frame plate 82 by a suitable pivot 112 (FIGS. 3 & 4). Lever arm 110 is perforated, so that when fasteners 118 (FIGS. 4, 6) are installed, a proper lever arm length is established. In any event, it is important that once installed, the apparatus 50 can orient the blocking plate 104 between the gas connections as seen in FIG. 4. By having a two piece arm 110 length adjustability is facilitated. This enables preventer device 50 to be retrofitted to a variety of different pipe configurations.

Lever arm 100 preferably tracks within lock 120 that projects from frame plate 84. Lock 120 comprises a pair of curved, spaced apart halves 120A and 120B (FIG. 4) between which the lever arm 100 is received. One of the lock orifices 122 will register with an orifice 111 in the lever arm 100 when the arm is moved outwardly (i.e., FIG. 6). A fastener 126 may temporarily pin the arm and lock to maintain the arm out of contact with the gas fueling apparatus until refueling or loading is finished. Of course at this time the vehicle cannot run as its control circuitry (i.e., electrical ignition in gasoline engines) is disabled.

Figure 7:
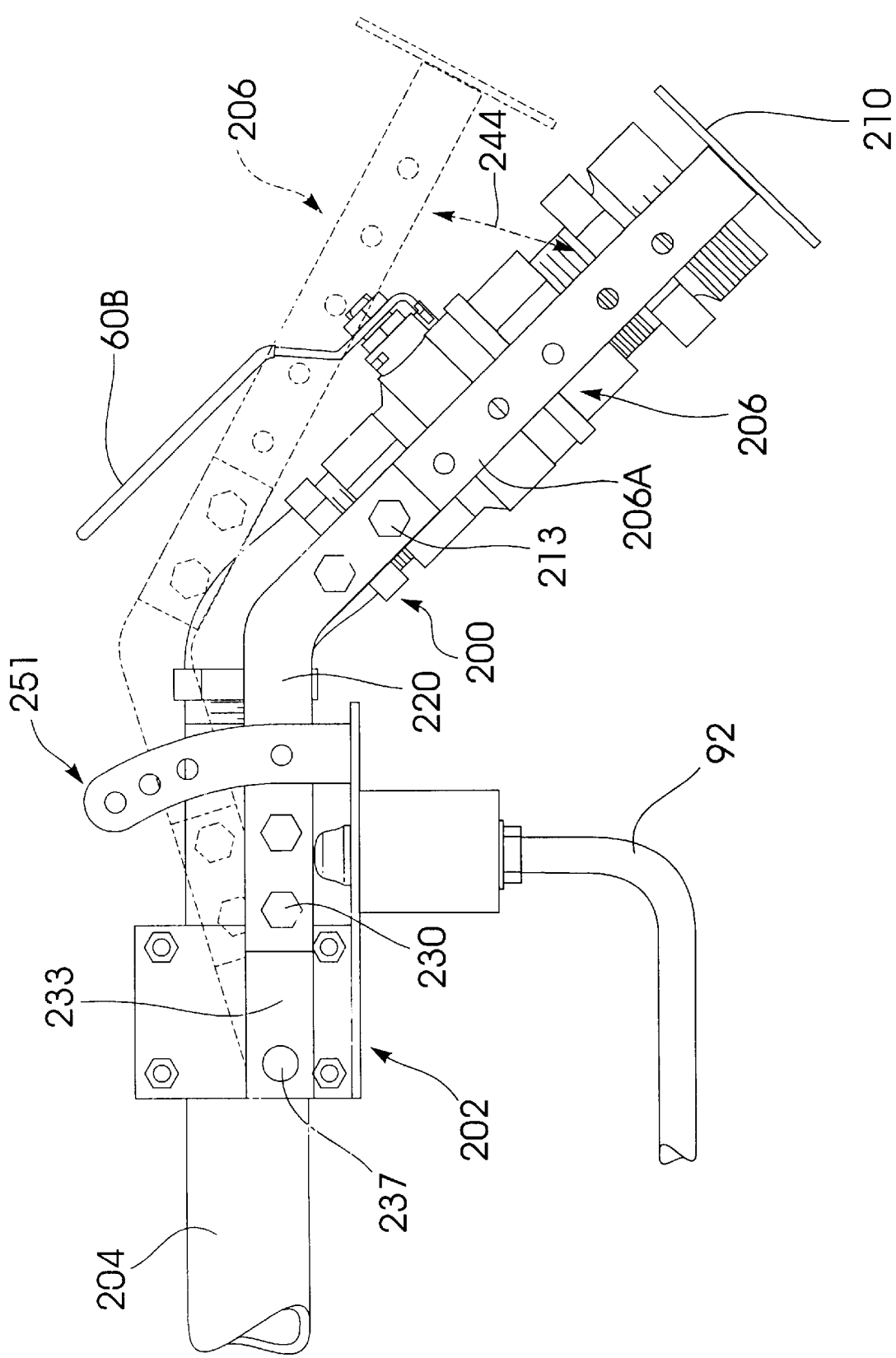
FIG. 7 is a side elevational view of a modified version of my invention with an angled lever arm that accommodates angled hardware.

Turning now to FIG. 7, an alternative embodiment of my device has been generally designated by the reference numeral 200. Embodiment 200 is quite similar to embodiment 50 previously described. Similarly, it mates to the gas pipe system which may be within the enclosed fueling compartment 40 of a truck 20. However, it will be noted that the pipe construction is substantially angled, and it is approximately 45° degrees in FIG. 7. Hence, the frame structure 202 mounted to pipe 204 supports an angled, multipiece arm 206. The arm terminates in a blocking plate 210 that functions similarly to plate 104 previously discussed. It may be displaced to the position illustrated in dashed lines.

With preventer 200 positioned as in FIG. 7, the fueling interconnection to the stored LP gas tank 24 (FIG. 1) cannot be made. Arm 206 comprises a first section 206A that supports plate 210. It is coupled through bolts 213 to an angled portion 220 that is in turn coupled with bolts 230 to the pivoted base portion 233. Arm 206 is thus pivoted at fastener 237 to move away as indicated in dashed lines. At this time it will travel as indicated by arrow 244 and again it may be pinned in position within a lock piece 251. Once the arm 206 is displaced out of the way as indicated in dashed lines (FIG. 7), the lever 60B may be opened after connection of the gas fitting apparatus as previously described. The process is reversed when fueling has been completed. The switch functions similarly.

Figure 8:
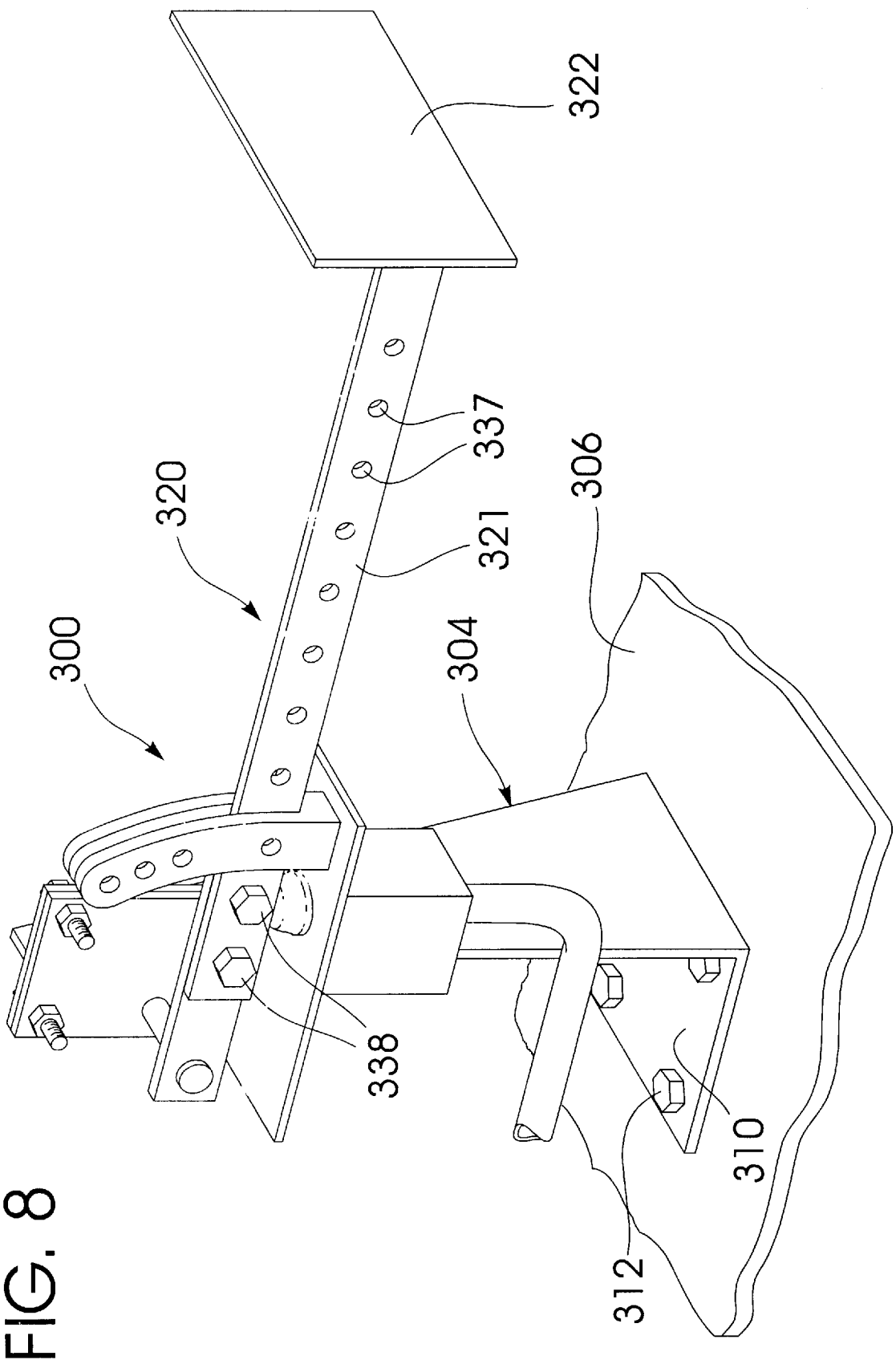
FIG. 8 is a fragmentary isometric view of another modified version of my invention showing a floor mount stand arrangement.

In FIG. 8 an alternative embodiment of my preventer device has been generally designated by the reference numeral 300. Preventer 300 supports a downwardly projecting, metallic base member 304 whose flanged baseplate 310 is attached to a suitable supporting surface 306 with suitable fasteners 312. Surface 306 may comprise, for example, the bed of the truck within the compartment 40. The self-supporting stand variation 300 may employ substantially the same arm structure as preventers 50 and 200 previously discussed. Lever arm 320 supports a spaced-apart blocking plate 322. Orifices 337 defined in arm section 321 enables length to be adjusted by proper placement of fasteners 338.

Figure 9:
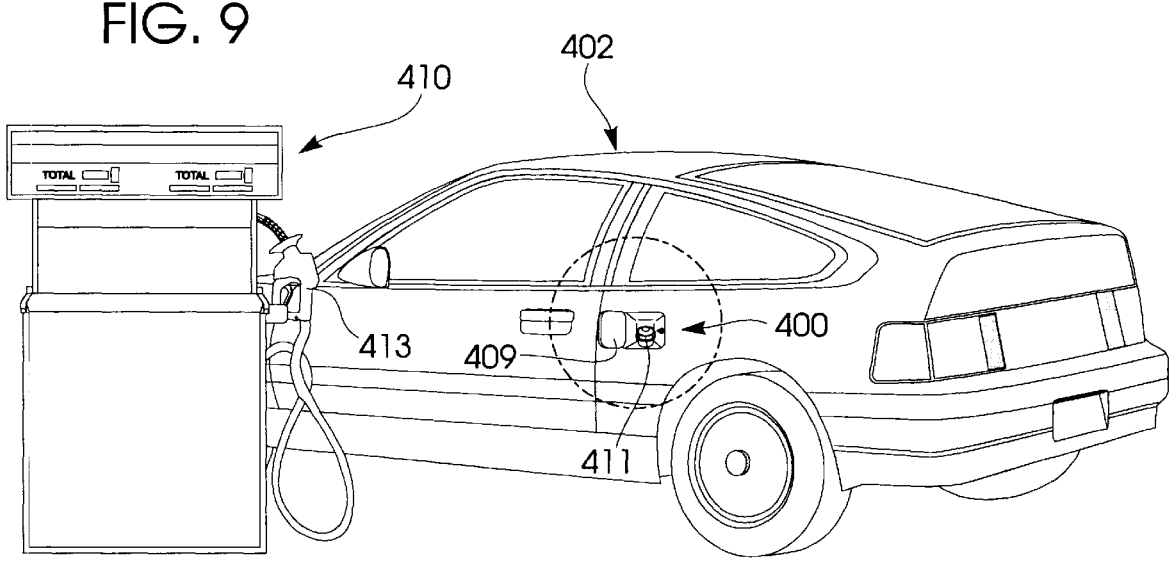
FIG. 9 is an enlarged, pictorial view of an alternative embodiment of my invention, which is employed with conventional vehicles; and, FIG. 10 is an enlarged, fragmentary view of the invention of FIG. 9.
Figure 10:
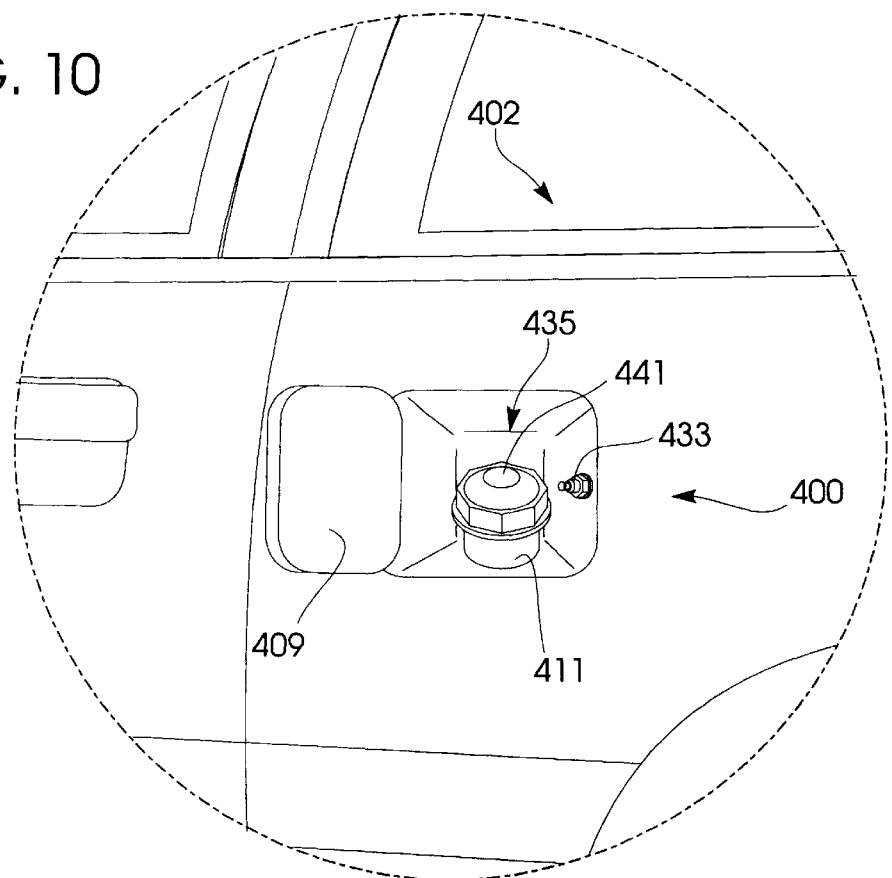

Referring now to FIGS. 9 and 10, an alternative embodiment of my concept has been generally designated by the reference numeral 400. Here the system takes on a relatively different appearance because it is adapted for automobiles for typical liquid refueling. Although "pull aways" and "break aways" are common in the LP gas refueling industry, they also occur with alarming frequency at ordinary self-service gas stations. FIG. 9 illustrates a typical vehicle 402 that is to be refueled by conventional gasoline pump 410. In this instance fuel inlet cover 409 must first be opened. This will make the refueling pipe 411 that leads to the vehicle gas tank, (not shown) accessible.

As seen in FIG. 10 preventer 400 comprises an electrical switch 433 disposed within the gas cap compartment 435 normally enclosed by door 409 adjacent to refueling inlet 411. When door 409 is shut, ignition switch 433 is deflected by the door to allow vehicle ignition. With the door 409 opened as in FIG. 10, the switch 433 interrupts the vehicle's ignition. Unless door 409 is closed, switch 433 will not establish electrical interconnection, thus making ignition impossible. Hence, the vehicle cannot be started with door 409 open. If the driver of vehicle 402 leaves the engine running when he pulls up to the pumps (as the law in most states prohibits), the vehicle engine will shut off as soon as door 409 is opened.

Obviously the driver must open door 409 to refuel. Legal regulations require that vehicles be shut off during refueling anyway. Whether or not vehicle 402 is running when the driver exits the car for refueling, as soon as door 409 is opened ignition is disengaged and the vehicle's engine is shut off. Once the gas cap 441 is removed and refueling is finished, door 409 must be closed to allow switch 433 to enable subsequent ignition. Door 409 cannot be closed if the fuel output nozzle 413 is still inserted in the filler pipe 411. Therefore, pull aways are prevented as the fueling nozzle 413 must be removed from the vehicle 402 before the driver can start the vehicle and drive away.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A pull away prevention device adapted to be employed with fuel delivery vehicles that are reloaded at fuel delivery stations, wherein the vehicles have laterally extending fuel inlet pipes and the stations have fuel outlet pipes, the device comprising:

a rigid frame adapted to be mechanically mounted upon or adjacent to at least one of said fuel inlet pipes to which one of said fuel outlet pipes must be mechanically coupled to refuel a vehicle;

an elongated arm connected to said frame and extending away therefrom, said arm adapted to be displaced between at least a first position substantially parallel with said at least one fuel inlet pipe to prevent refueling and a second, deflected position wherein refueling is enabled;

a blocking mechanism secured to said arm for selectively blocking connections to said at least one fuel inlet pipe when said arm is disposed in said first position by interposing itself between said at least one fuel inlet pipe and said fuel outlet pipes to prevent mechanical connection of said at least one fuel inlet pipe to said fuel outlet pipes; and, electric switch means controlled by said arm for disabling a vehicle while loading or refueling, said switch means activated by displacement of said arm.

2. The pull away prevention device as defined in claim 1 wherein said arm is adjustable in length.

3. The pull away prevention device as defined in claim 2 further comprising a stand for mounting the device upon a supporting surface.

4. The pull away prevention device as defined in claim 1 wherein said arm is angled to accommodate angled fuel inlet pipes.

5. The pull away prevention device as defined in claim 1 further comprising a lock in which said arm tracks for locking the device in a selected position.

6. The pull away prevention device as defined in claim 5 wherein said arm is adjustable.

7. The pull away prevention device as defined in claim 6 wherein said arm is angled to accommodate angled fuel inlet pipes.

8. The pull away prevention device as defined in claim 5 wherein said arm is angled to accommodate angled fuel inlet pipes.

9. A method for preventing pull aways by fuel delivery vehicles that are reloaded at fuel delivery stations, wherein the vehicles have laterally extending fuel inlet pipes and the stations have fuel outlet pipes, the method comprising the steps of:

securing an elongated, pivotally-displaceable arm adjacent at least one of said fuel inlet pipes;

blocking connection between said at least one fuel inlet pipe and said fuel outlet pipes with said arm when disposed in a first position substantially parallel with one of said fuel inlet pipes by interposing a blocking member supported by said arm between said at least one fuel inlet pipe and said fuel outlet pipes;

exposing access to and interconnection of said at least one fuel inlet pipe and said fuel outlet pipes with said arm when disposed in a second position;

disabling the vehicle ignition while loading or refueling while said arm is in said second position and enabling the vehicle ignition while said arm is disposed in said first position.

10. The method as defined in claim 9 wherein said disabling step includes the step of interrupting vehicle ignition with switch means directly activated by pivoting of said arm.

11. The method as defined in claim 10 including the step of adjusting the length of said arm to adapt it for different fuel inlet pipe configurations.

12. The method as defined in claim 9 including the step of adjusting the length of said arm to adapt it for different gas pipe configurations.

* * * * *